US011605929B2

(12) United States Patent
Rockenfeller et al.

(10) Patent No.: US 11,605,929 B2
(45) Date of Patent: Mar. 14, 2023

(54) THERMAL MANAGEMENT SYSTEM FOR DIRECTED ENERGY WEAPON SYSTEM

(71) Applicant: Rocky Research, Boulder City, NV (US)

(72) Inventors: Uwe Rockenfeller, Boulder City, NV (US); Kaveh Khalili, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 174 days.

(21) Appl. No.: 16/893,234

(22) Filed: Jun. 4, 2020

(65) Prior Publication Data
US 2021/0381736 A1 Dec. 9, 2021

(51) Int. Cl.
*F25B 49/02* (2006.01)
*H01S 3/04* (2006.01)
*F28D 15/00* (2006.01)
*F41H 13/00* (2006.01)

(52) U.S. Cl.
CPC .......... *H01S 3/0405* (2013.01); *F25B 49/022* (2013.01); *F28D 15/00* (2013.01); *F41H 13/0062* (2013.01); *F25B 2400/075* (2013.01)

(58) Field of Classification Search
CPC .. F25B 49/022; F25B 2400/075; F28D 15/00; F41H 13/0062
See application file for complete search history.

(56) References Cited

U.S. PATENT DOCUMENTS

| 10,584,903 | B2 | 3/2020 | Rockenfeller et al. |
| 2010/0236758 | A1* | 9/2010 | Ullman ................... F28D 15/00 165/104.19 |
| 2013/0140283 | A1 | 6/2013 | Bradley |
| 2014/0166232 | A1* | 6/2014 | Al-Hallaj ................ F24T 10/15 165/11.1 |
| 2016/0120059 | A1 | 4/2016 | Shedd |
| 2017/0074166 | A1 | 3/2017 | Gagne |

OTHER PUBLICATIONS

U.S. Appl. No. 16/864,771, filed May 1, 2020, Khalili et al.
International Search Report and Written Opinion dated Nov. 12, 2021 for PCT/US2021/035430.

\* cited by examiner

*Primary Examiner* — Nael N Babaa
(74) *Attorney, Agent, or Firm* — Shumaker & Sieffert, P.A.

(57) ABSTRACT

Disclosed are systems and methods of heating and cooling a laser system by providing a vapor compression system having a plurality of compressors. A control system controls the activity of each compressor and activates and manages the speed of each compressor to efficiently provide cooling and heating of the laser system.

32 Claims, 4 Drawing Sheets

THERMAL MANAGEMENT SYSTEM FOR DIRECTED ENERGY WEAPON SYSTEM

BACKGROUND

Field of the Invention

This disclosure relates generally to a heating and cooling system for thermally controlling a Directed Energy Weapon (DEW) system. In particular, the system may include a plurality of compressors that are electronically controlled to manage cooling rapid bursts of heat and managing the temperatures of the related hotel loads associated with such a weapon system.

Description of the Related Art

There are many types of Directed Energy Weapon (DEW) systems being developed, each using a type of focused energy to destroy a target. These DEW systems may use a laser, microwave or particle beam to target missiles, vehicles, Unmanned Aerial Systems (UAS), airplanes or other targets. Each type of DEW system fires relatively short, intense bursts of energy. Many of these systems, particularly high energy lasers generate high heat loads which need to be cooled in order for the DEW to be able to continue firing without overheating. In some cases, especially in stationary uses, large cooling systems can be deployed to cool such systems.

However, mobile and smaller DEW systems have size, weight and power (SWAP) requirements that make it difficult to install bulky, heavy cooling systems on, for example, a portable DEW platform. Conventional vapor compression systems may be efficient at cooling environmental loads, such as rooms or systems with relatively slow gains in heat. However, such systems may not provide rapid cooling features due to the long duration, of up to a minute or in some cases more, to reach full capacity. In some cases, a conventional vapor compression system may take several minutes or longer to provide sufficient cooling to a load. Once these vapor compression systems are running they can be efficient in cooling a target heat load to a specific temperature.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing systems, devices and methods.

One embodiment is a directed energy weapon platform. This embodiment includes a laser system; one or more hotel loads; a vapor compression system comprising a plurality of compressors configured to compress a refrigerant, with a first one or more compressors and a second one or more compressors operating cooperatively to cool a heat transfer fluid circulated in a cooling loop to the laser system and hotel loads; and a control system programmed to activate one or more of the plurality of compressors when the laser system is activated to boost the cooling capacity of the vapor compression system so that the total cooling capacity can satisfy the hotel loads and the activated laser system.

Another embodiment is a method of operating a laser weapon system. This embodiment includes operating a first one or more compressors and an evaporator in thermal communication with a heat transfer fluid that is being cooled by the evaporator; pumping the heat transfer fluid to hotel loads connected to the laser weapon system to maintain the hotel loads within a predetermined temperature range; and detecting the laser weapon system entering an active firing mode, and in response activating a second one or more compressors to add additional cooling power to the heat transfer fluid and pumping at least a portion of the heat transfer fluid to the laser weapon system.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

A Directed Energy Weapon (DEW) system and platform are described, which includes systems and methods for managing the temperature of the DEW system and related equipment on the platform. The DEW system may be located on a portable platform, and include a laser system, vapor compression system, generator, battery bank and related hotel loads that comprise the entire system. In one embodiment, the DEW system comprises a control system to manage heating or cooling the laser system, wherein the control system manages the activity of multiple vapor compression compressors within the vapor compression system.

For example, the platform may have a vapor compression system that has a plurality of variable speed compressors. These compressors may be controlled by the control system to provide necessary thermal management of the laser system and also the hotel loads on the platform. By using temperature and other sensors, and having a plurality of variable speed compressors available, the control system can intelligently route cooling or heating power to the components that need to be cooled or heated to maintain the system in an operational condition.

Although the below description focuses on cooling the laser system and associated hotel loads, it should be realized that the vapor compression system may also be used to heat various components of the system. This may be desirable in cold climates, such as during the winter, where the laser system and hotel loads need to be maintained at a particular minimum temperature in order to be operational. Thus, embodiments are not solely limited to cooling the various components. In addition, it should be realized that the system may also comprise additional heating systems, for example through the use of heat generated by burning fossil fuels, or heat generated by an electric resistant heater. In addition, waste heat, for example from an electric generator mounted on the platform may also be used to heat various components of the overall system, if the generator is running and heating is required at the same time.

When the laser system is in an inactive state, a first compressor, or set of compressors, in the vapor compression system may become active to provide cooling via an evaporator. A fluid pump may then pump heat transfer fluid by routing it through a heat exchanger in thermal contact with the evaporator and then route such cooled heat transfer fluid through a cooling loop to cool hotel loads on the platform in order to cool the ancillary equipment to their operational temperature. If needed it can also provide some cooling to the laser to maintain a specified stand-by temperature. It should be noted that the vapor compression system may not be static, and through the use of controllable valves, the specific pathway of heat transfer fluid within the cooling loop may be altered over time by the control system to bypass, or include, or modulate the flow, for each component on the platform that is in fluid connection with the cooling loop. The control system is configured so that the control of the vapor compression system to these components can be dictated by their actual temperature conditions and the temperature condition they need to be at to properly function or be ready to function if called upon. The order of the components to be cooled in series, parallel or combinations thereof may depend on the cooling temperature requirements of the components to be cooled.

During times where the laser is moved into an active state to be become ready to fire, additional compressors in the vapor compression system may be activated and compressor speed may be increased to immediately add additional cooling power to the primary cooling loop by increasing the cooling capacity and, as required with time, the flow rate of the heat transfer fluid that is circulated through the cooling loop. In one embodiment, the cooling capacity of the vapor compression system is increased by 2.5 times to 4 times of the laser output power. The increased flow rate of heat transfer fluid can be run through the laser weapon, and then to the ancillary equipment. If the laser begins firing, and the cooling power from adding the additional one or more compressors and adding speed is insufficient to properly control the temperature of the laser system to below a threshold value, the control system may add additional cooling power by further increasing the speed of the one or more compressors to add even more cooling power to the laser system. Alternately, the speed can be increased first or in parallel, e.g. the first compressor increases speed as the second compressor initiates operation and also ramps up speed. If there are more than 2 compressors, as may be the case for higher power laser systems the same logic of adding compressors and/or speed applies. If this still does not provide enough cooling power to the laser system, the control system may then monitor the temperatures of the ancillary equipment on the platform to determine if any ancillary equipment may be able to temporarily function at higher temperatures or may be temporarily rolled back in its operation. If so, the control system may alter the controllable valves within the system to fully or partially bypass those components in the ancillary equipment that do not need additional cooling power from the vapor compression system.

In one embodiment, the heat transfer fluid is approximately 30% to 50% ethylene or propylene glycol in water, however, other compositions of heat transfer fluid are also within the scope of embodiments of this invention. For example, alcohol or acetone water mixtures or similar heat transfer fluids are also possible. In one embodiment the heat transfer fluid is a refrigerant being pumped through the cooling loop, which would undergo a phase change in the heat exchangers. The heat transfer system may also consist of more than one cooling loop and be configured as a combination of heat transfer fluid and refrigerant circuits.

In another embodiment, the DEW platform also includes a thermal energy storage system. For example, a thermal energy storage may be used to additionally cool the heat transfer fluid in the cooling loop. Many different types of materials may be used as phase change materials within the thermal energy storage, including inorganic systems such as salt and salt hydrates, or organic compounds such as paraffins or fatty acids. Polymeric materials, such as poly(ethylene glycol) may also been used in addition to chilled water and ice systems. In one embodiment, the thermal energy storage comprises a salt hydrate, such as a potassium fluoride tetra hydrate as the phase change material that is used to store heat from the heat transfer fluid. Other systems may use fuel fired ammoniated complex compounds as described in U.S. Pat. No. 10,584,903 issued on Mar. 10, 2020, the entirety of which is hereby incorporated by reference. In other embodiments, the thermal energy storage system uses chilled water or a heat transfer fluid reservoir.

For example, one of the hotel loads that may be positioned on a DEW platform is a battery bank that provides power to the laser system as its firing. The battery bank may be designed to function while the batteries are operating between a low temperature of 10° C. and a high temperature of 55° C. If the control system determines through a temperature sensor that batteries in the battery bank are near the lower temperature 10° C., then the control system may initially heat the batteries. If the temperature of the battery bank is at a higher temperature, but below their optimum operating temperature, the control system can then prioritize cooling of the laser, and therefore change the controllable valves to the battery bank to reduce the amount of thermal transfer fluid flowing to the heat exchanger connected to the battery bank. This will cause the battery bank to increase in temperature over time as the cooling power to it is reduced, but it will also reduce the temperature of the heat transfer fluid returning to the compressors, allowing them to cool the outgoing fluid of the vapor compression system to a lower temperature to help cool the laser more easily, or allow for a higher flow rate of the heat transfer fluid. Once the battery bank reaches a critical temperature, the control system will need to route heat transfer fluid to the battery back as well.

In one embodiment, the battery bank may be constructed of lithium ion battery cells of high energy capacity which support fast charging and large discharge C-rates. Examples of such batteries include lithium nickel-cobalt-aluminum-oxide (NCA) type batteries. In one embodiment, the battery cells are connected in more parallel subpacks to achieve the high current (Amp) requirements to provide sufficient power to the laser system when it is in a firing mode. In one embodiment, a greater depth of energy on the platform can be achieved by selecting the proper battery cells, and also by increasing the number of battery cells connected in parallel with the battery modules that make up the battery bank.

It should be realized that the DEW platform may be programmed to operate in a variety of environmental conditions. In hot temperatures, such as in the dessert during the summer, the first variable speed compressor, or set of compressors, may need to run at a relatively high rate of speed, or the set of compressors may be used at a low speed, and the cooling loop configured through the controllable valves to include each major component even when the laser is not firing. In more mild conditions, only a first variable speed compressor may need to run at a relatively low rate of speed, and may have the controllable valves set to bypass certain equipment on the platform that does not need to be cooled to maintain their operational temperature. For example, in milder conditions, the laser weapon may not need to be cooled to be operational, but other hotel loads, which are being used whenever the system is deployed, may need to be cooled to be brought down to an operational temperature. In very cold environments, the laser weapon or ancillary equipment may need to be heated to maintain their operability. In some embodiments, the system includes additional cooling options, such as the use of fans or other controllable devices to cool the ancillary equipment using ambient air. For example, the batteries may include one or more electronically controllable fans that can be used by the control system to cool the batteries. The generator may in some cases only need ambient air fan cooling.

In one embodiment, the laser system has a power of less than 20 kW, for example 15 kW, 10 kW or 5 kW. This size of laser would require electrical power, such as from a generator, of less than 75 kW of power, for example a generator of 35 kW of power may be able to provide sufficient energy for a 10 kW or slightly higher capacity laser device. Such generator size can be further reduced if adequate battery energy storage capacity is available and the duty cycle (the time of laser operation divided by the times of laser operation plus non-operation) is below 100%, and especially if it is below 50% or even below 35%. In such cases a smaller generator can run during lasing and non-lasing times and use the non-lasing times to recharge the batteries.

In one embodiment, the laser system has laser discharge (firing) periods of equal to or less than 120 seconds. For example, discharge periods may be 120, 100, 90, 60, 30 seconds or less. In one embodiment, the DEW system is a high energy laser system configured to fire for up to 120 seconds on, followed by 280 seconds of a recovery time. This results in a 30% duty cycle. Other duty cycles, particularly greater than 20% are specifically contemplated within the scope of the invention. For example, the duty cycle may be 20%, 25%, 30%, 50% or even higher. In some embodiments, the charge periods are relatively short, such as less than 300 s. In some embodiments, the charge periods are less than 150, 120, 100, 60, or even 30 seconds.

The components on a DEW platform are usually powered by the generator and the battery bank, often fully powered through the battery bank, which itself is charged by the generator to provide the necessary power to all powered equipment and especially the laser during firing episodes. For example, a 35 kW generator may charge a battery bank during quiescent times as well as during firing when the laser system is active. During firing episodes, the laser may use energy stored in the battery bank while the generator engages to recharge the batteries as the laser is firing. The "magazine depth" of a laser weapon is the aggregate optical energy output for a specific firing period. Providing a battery power source along with the portable generator can give the laser a high magazine depth so that it can continue firing repeatedly during a specific firing period without overloading electrical energy demands upon the portable generator. In addition, as discussed above, the vapor compression system managed by the control system may provide flexible cooling options from multiple, two or more, variable speed compressors to maintain the laser at an operational temperature during these burst mode firing periods so that the high magazine depth may be reached without overheating the laser diodes and diode amplifiers responsible for generating the laser light.

As used herein a hotel load may include radar systems, batteries, power modules, motors, computers, electronics, optics, electronic warfare equipment and in some cases generators, if not directly air cooled, as well as other equipment that is ancillary to the main weapon system. In particularly warm environments, such as the desert, these additional components may work more efficiently by being cooled prior to use. In particularly cold environments, such as during winter or northern areas or high elevations, these additional components may need to be heated to a target operating temperature in order to work more efficiently or work without failure. Thus, in one embodiment, the vapor compression system acts as an ancillary cooling/heating system configured to cool or heat these additional hotel load components (as well as the laser diode amplifiers) to a predetermined temperature, or within a temperature range, so that they operate reliably in many types of environments. In addition, the vapor compression system may be used to recharge and cool the thermal energy storage system prior to the time the directed energy weapon system is in use.

In some embodiments, the vapor compression system comprises a vapor compression system with a plurality of variable speed compressors that are controlled to vary the output capacity of the vapor compression system. In some embodiments, the system may have 2, 3, 4, 5, 6 or more variable speed compressors, all operating under control of the control system to manage the proper cooling power of the system. The vapor compression system may be controlled by a control system that is a Vector Control System (VCS) configured to optimize the efficiency of the vapor compression system by varying the torque placed on each of the compressors within the system.

Embodiments of the Vector Control System (VCS) described herein expand the one-dimensional speed control of the vapor compression system into a two-dimensional speed and torque control system. Incorporating torque control into the vapor compression system allows for optimal use of each compressor motor to increase the overall system efficiency. The VCS may also control other motors within the vapor compression system, such as pumps, fans and blower motors. A VCS optimization process can take into account characteristics of each compressor motor's performance as a function of speed, compression ratio and absolute pressures. The VCS may also take into account other system motors in the system to improve the efficiency of condenser fan(s) and in some cases evaporator fans or blowers or fluid pump motors in cases where the evaporator cools a heat transfer fluid. Vector Drive control constitutes a two dimensional energy efficiency optimization incorporating refrigerant flow as well as high side (condenser) air flow and, in some instances low side (evaporator) air flow or pumped fluid flow, deriving the best system energy efficiency obtainable at any given load and temperature condition. As will be recognized, fluid pumps are generally controlled by a motor and the term "pump" as used herein may include the motor that drives the pump. The motor may be part of the pump as a hermetic system or connected to the pump via a gear, belt, pulley or magnet, as known to those skilled in the art.

The use of a vector control system may save the overall electrical energy requirements of a directed energy weapon system by reducing the power requirements for the vapor compression system. This may be important for directed energy weapon systems that are transportable and powered by portable generator systems using fossil fuels. In these transportable systems, the directed energy weapon system, portable generator, and vapor compression systems may be located on one or more mobile platforms. Since the energy required to operate the directed energy weapon system is being provided by a portable generator, any savings in electrical energy can translate into a fuel savings. By saving the fuel, the transportable system may be able to remain active for a longer period of time before needing to be refueled.

The control system monitors the temperatures of the various systems, including the laser weapon system, the ancillary components and the vapor compression system. The control system uses stored logic and programming to determine the appropriate use of each component. If the weapon system is idle, and the temperature of the hotel loads are high, the control system may activate the vapor compression system to begin cooling the hotel loads. As used herein, the hotel load may include the ancillary components necessary to run the laser weapon system in a variety of environments. For example, the hotel load may include optics, electronic warfare equipment, communications, radar, batteries, computers, and at times climate control and other components that give off heat and support use of the laser weapon system. The vapor compression system may be configured to maintain the hotel load at a predetermined temperature or various temperatures as required by the components between and during laser burst cooling cycles as the system is being activated.

It should also be realized that there may be many different components of the hotel load that each need to be cooled by the vapor compression system, either serially or in parallel. In one embodiment, the vapor compression system may serially first cool the laser system, and then cool a set of hotel load components by running a heat transfer fluid from relatively cool components to hotter components. For example, the vapor compression system may have a fluid line carrying heat transfer fluid to a first heat exchanger for a hotel load adjacent the laser weapon that is in a ready, but not firing, state and operating at 40° C. As the thermal heat transfer fluid leaves the first heat exchanger it may cool the first component to 35° C. and be warmed to near 30° C. The fluid line may then enter a second heat exchanger that is adjacent to or integrated in a second hotel load component that is operating at 55° C. If the thermal heat transfer fluid still has capacity to absorb additional heat, it can also cool the second component from 55° C. to 50° C. temperature.

In a second embodiment, the vapor compression system may connect in parallel to one of more of the components within the hotel load, such that each component has a heat exchanger directly tied to the vapor compression system via a heat transfer loop. In one embodiment, the system may use electronically controllable valves to alter the flow of the thermal transfer fluid to the various components to maintain them at the proper temperature to keep the system operational. This may involve reducing the flow of heat transfer fluid to certain components, or bypassing them entirely, to bringing additional cooling power to other more critical components.

In one embodiment, the hotel load may be a hotel load of the vehicle support system, such as communication electronics or climate control. In another embodiment, the hotel load is the thermal load caused by all systems on a vehicle or platform other than propulsion. For example, a hotel load of a military vehicle may be the thermal loads caused by radar equipment, inverters, electronics, batteries, cabin loads and the warfighter. Embodiments of the vapor compression system may be configured to thermally regulate these hotel loads to keep them at a predetermined temperature.

The control system may be configured in many ways to activate the vapor compression system by activating a second, third, fourth and/or fifth compressor, and altering the speed of the active compressors to bring the necessary amount of cooling power to the laser system during activation. In one embodiment, the control system is any electronic device or apparatus that activates, modulates, or deactivates compressors and the flow of refrigerant or heat transfer fluids in the system.

In some embodiments which use multiple compressors and multiple evaporators, the vapor compression system may further include a refrigerant reservoir or chamber. The reservoir may be used to help manage the inventory of refrigerant circulating through the various compressors, condensers and evaporators in complex vapor compression systems.

In one embodiment, the control system is linked to one or more or a multitude of temperature sensors and activate a cooling cycle when a temperature sensor of a hotel load or a sensor of the laser system reaches a predetermined target temperature. The temperature sensor is likely thermally linked to the laser weapon system so when that thermal load reaches the predetermined target temperature, a cooling cycle is begun and the various connected compressors are activated as discussed above.

Alternatively, the control system may be electronically linked to an activation signal that triggers a cooling cycle. The activation signal may be controlled by a predictive process that senses a variety of data and then predicts when to activate a cooling cycle. For example, the control system may sense the present temperature of the thermal load, the time since the last activation, and the state of other equipment or devices linked to the directed energy weapon system including possible threat alert signals. Using this data, the system may activate a cooling cycle just before the laser system starts to operate. In some embodiments, the control system may activate a cooling cycle 1, 2, 3, 4, 5, 6, or 10, 20 or 30 seconds in advance of a determined cooling event.

A. System

Figure 1:
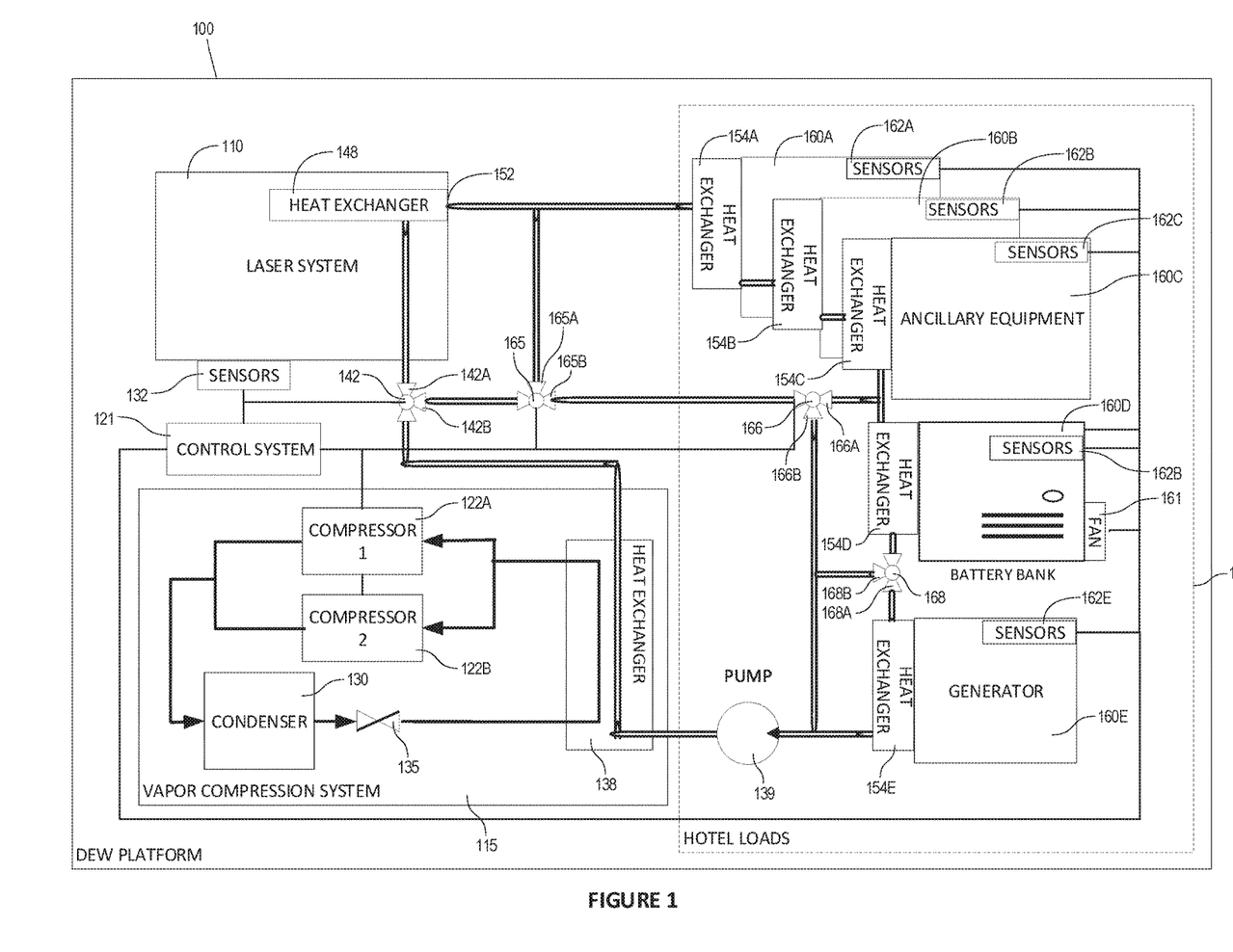
FIG. 1 is a schematic illustration of an embodiment of a Directed Energy Weapon platform having a laser system, vapor compression system, hotel loads that include a generator and battery bank.

Referring now to FIG. 1, a directed energy weapon platform 100 is shown. The platform includes a laser system 110, vapor compression system 115 and hotel loads 120. A control system 121 electronically communicates with the laser system 110, vapor compression system 115 and hotel loads 120 to control the operations of these components of the platform 100.

The vapor compression system 115 includes a first compressor 122A and a second compressor 122B. The compressors 122A, 122B are in a vapor compression loop with a condenser 130, an expansion valve 135 and an evaporator heat exchanger 138. During operation, the evaporator heat exchanger 138 cools heat transfer fluid from a pump 139 that is circulating heat transfer fluid within a cooling loop on the DEW platform 100. As the heat transfer fluid passes through the evaporator heat exchanger 138 it releases heat. The cooled heat transfer fluid is then circulated to the components on the DEW platform. In one embodiment, the heat transfer fluid is ethylene glycol/water, although other known heat transfer fluids are contemplated within the scope of the invention.

The first compressor 122A and second compressor 122B may be the same size compressor or may be different sized compressors. In one embodiment, the compressors 122A, 122B are variable speed compressors. In addition, the condenser 130 may be sized to handle condensing refrigerant within the vapor compression loop from the maximum output of both compressors running simultaneously when operating at their maximum capacity. Although the vapor compression system 115 is shown with two compressors feeding into a single condenser, it should be realized that other configurations are also contemplated. For example, each compressor could feed into its own condenser which then connect to the same, or different expansion valves. Moreover, the system may have more than two compressors, for example, 3, 4, 5, 6 or more compressors all acting cooperatively to provide cooling power to the components on the DEW platform.

The system is also shown having a single evaporator heat exchanger within the vapor compression loop. It should be realized that the vapor compression loop may have two or more evaporator heat exchangers. In some embodiments, there is one evaporator heat exchanger and one condenser for each compressor within the vapor compression system.

The control system 121 electronically communicates with the various controllable components located on the DEW platform for efficiently cooling or heating the components. The control system 121 may control the fluid pump 139, laser system 110, vapor compression system 115 and hotel loads 120. For example, the control system 121 may communicate with the compressors 122A and 122B to control which compressor is active, and the speed of each compressor when they are capable of running at variable speeds. In addition, the control system may monitor a variety of environmental and other sensors to monitor the temperature and state of each of the various components. Furthermore, the control system may receive signals for preparation, incoming threats and associated DEW readiness.

For example, the control system 121 may communicate with sensors 132 connected to the laser system. The sensors 132 may measure the temperature of laser diodes diode amplifiers, or other components of the laser system and communicate that temperature to the control system to monitor how much cooling energy is required to maintain the laser system within a predetermine temperature range to keep the laser system operational. As will be explained below more fully, the control system also communicates with various controllable valves, pumps, and other sensors located on the DEW platform 100 to circulate heat transfer fluid to the components on the system based on their current cooling or heating needs.

Referring back to the vapor compression system 115, the output 137 of the heat exchanger 138 runs along an output cooling line 140 to a first controllable valve 142. The first controllable valve 142 is connected to, and electronically controllable by, the control system 121. The first controllable valve 142 has two outputs 142A and 142B. The first valve output 142A connects to the laser system 110. The second valve output 142B connects to a second valve 165A that provides flow of heat transfer fluid as part of the cooling loop to the hotel loads 120.

Heat transfer fluid that flows through the first controllable valve 142 and out the outlet 142A fluidly connects to a heat exchanger 148 within the laser system 110. The control system 121 may control the position of the first controllable valve 142 to change how much heat transfer fluid flows to each output of the valve. When the first controllable valve 142 is set to a first position, a selected portion of the heat transfer fluid flows through the valve 142, out the first valve outlet 142A and into the heat exchanger 148 in order to provide cooling power to the laser system 110. A portion of the heat transfer fluid may also flow through the valve 142 and out the second valve outlet 142B to an inlet of the second valve 165. The setting of the valve 142 determines what percentage of the heat transfer fluid flow entering the valve 142 is directed into each output 142A and 142B.

It should be realized that the controllable valves as discussed herein are not binary valves that are only in an on or off position. Each valve may be controlled by the control system 121 to allow a specific percentage of heat transfer fluid within the cooing loop to flow to each component connected to the valve outputs. For example, in one electronic configuration a two-outlet valve may be set to allow 25% of the flow rate to one outlet and 75% of the flow rate to the other outlet. The control system may then change the positon of the valve to allow 50% of the flow rate to each outlet. Of course, other percentages and flow rates through the controllable valves are within the scope of the invention. In addition, it should be realized that in some configurations, each valve may have 2, 3, 4 or more outlets, each controllable by the control system 121. Other valve configurations, such as solenoid valves that open and close at various frequencies can be used as well and are also within the purview of the invention.

After the heat transfer fluid flows through the heat exchanger 148 in the laser system 142, it flows out a laser system outlet 152 and into one or more components of the hotel loads. As shown in FIG. 1, the outlet 152 of the laser system 110 flows into a heat exchanger 154A of ancillary equipment that is part of the hotel loads. Each piece of ancillary equipment within the hotel load that needs to be cooled by the vapor compression system would generally have some type of heat exchanger. Thus, there may be a series of heat exchangers 154A, 154B, and 154C, each cooling ancillary equipment 160A, 160B and 160C, respectively. As mentioned above, the ancillary equipment may include radar systems, batteries, power modules, pumps, motors, computers, electronics and other equipment that is ancillary to the main laser system 110.

As shown in FIG. 1, the heat exchanger 154A within the ancillary equipment 160A may be connected to the cooling loop in two ways. In the first, the laser system outlet 152 connects directly to the heat exchanger 154A so that heat transfer fluid first passes through the laser weapon system before connecting to the heat exchanger 154A. In the second way, an outlet 165A of the second valve 165 routes heat transfer fluid to the heat exchanger 154A which bypasses the laser weapon system. By altering the positions of the valves 142 and 165, the control system 121 can route heat transfer fluid exclusively through the laser system 110, or completely bypass the laser system 110. In addition, each valve 142 and 164 can be set in any selected position to allow a predetermined percentage of heat transfer fluid to flow through the laser system 110 or bypass the laser system 110. This flexibility of directing heat transfer fluid serially through the laser system 110, or in parallel to bypass the laser system 110, or bypass some or all of the ancillary equipment, provides a high level of flexibility for cooling the laser system and each other component on the DEW platform 100 to be within its required operational temperature range.

The ancillary equipment 160A-C includes sensors 162A-C, wherein each such illustrated sensor may be a multitude of sensors, that are connected to the control system 121 to monitor the temperature and status of each piece of ancillary equipment on the DEW platform 100. The control system 121 monitors the temperature and status of these components to determine which particular hotel loads need more or less cooling power, and then the control system may adjust the controllable valves, including valve 165 to flow more or less heat transfer fluid to each piece of ancillary equipment 160A-C to maintain them within their operational temperature range. It should be realized that the overall amount of heat transfer fluid flow within the cooling loop may be controlled by changing the speed of the pump 139 which controls fluid flow within the cooling loop.

The second valve 165 within the cooling loop has a second outlet 165B that connects to a third valve 166 which also connects to part of the coolant loop within the hotel loads. The valve 166 has a first outlet 166A that connects to a heat exchanger 154D that is in thermal communication with a battery bank 160D. The battery bank 160D may comprise any type of battery configuration that is capable of providing high power output levels very quickly to support the energy requirements of the laser weapon system during firing. In one embodiment, the generator may be used to keep the battery bank charged during inactive times when the laser system is not operational. Once the laser system 110 becomes active and needs large amounts of energy for firing, the battery bank 160D can be used to provide bursts of power to support the laser system. A generator 160E may be used to recharge the battery bank 160D as the laser is firing.

In one embodiment, the battery bank is made from a plurality of individual battery modules which are substantially configured in a parallel connection to attain a high capacity (ampere-hour) and provide a high current to the laser when necessary to provide sufficient power for laser weapon firing events. In some embodiments, the battery bank comprises a serial and parallel configuration of individual battery modules to provide a high voltage along with a high capacity and current.

In addition to the heat exchanger 154D on the battery bank 160D, the battery bank may also use a controllable fan 161 to provide ambient air cooling to the battery bank 160D. The battery bank 160D may therefore be designed to be charged and recharged in very short periods by the generator 160E and air cooled with forced convection air flow across its cells. In one embodiment, the battery bank operates at a temperature of between about 10° C. and 55° C., preferably between about 40° C. and 50° C. In one embodiment, forced convection air flow may not be used (due to ambient air being too hot) such that the battery bank is only cooled via the heat exchanger 154D connected to the battery bank 160D. Heat exchanger 154D may also be positioned with the fan and used to cool ambient air such that the fan cooling is sufficient with now reduced temperature ambient air. In one embodiment, the batteries in the battery bank 160D have a high energy storage density, as opposed to a high C-rate, such that the they can be partially charged and re-charged during a laser firing mode for 4 or more firing cycles, preferably 6, 8 or more firing cycles, before the battery bank 160E is too low in charge and needs a longer recharge period from the generator 160E.

It should be realized that the fan 161 on the battery bank 160D may provide an air cooled option that operates with ambient air during operational periods when the ambient air is at or below about 40° C. At higher ambient temperatures, the control system 121 may determine that the battery bank may need to be cooled with the heat exchanger 154D, and thereby active the valve 168 to provide heat transfer fluid to the heat exchanger 154D.

The battery bank 160D may be made from any conventional battery modules, but due to size and weight limitations of the DEW platform 100, would generally be made from the lightest weight battery modules that can provide the highest energy output. Accordingly, lithium ion, nickel-cobalt-aluminum (NCA) or similar battery modules with a high energy capacity and rapid discharge and charge rate may be selected.

The heat transfer fluid that passes through the heat exchanger 154D of the battery bank 160D may then pass through a fourth valve 168 and into a heat exchanger 154E of a generator 160E. The fourth valve 168 has an outlet 168A to the generator heat exchanger 154E and an outlet 168B to return to the pump 139. It should be noted that in order to achieve proper flow the fluid loop is designed with parallel and serial fluid conduits using pipe diameters, manifolds and pressure restrictions to assure pressure drop will result in the desired flow rates with pipe design principles known to those skilled in the art.

The generator 160E may be Diesel, JP-8, natural gas, liquid gas, or other fueled generator configured to provide electrical power to the components on the DEW platform. The size of the generator may be selected based on the power requirements of the platform with the laser system, generally drawing the most amount of power on the platform when operational. For example, the generator may be a 5 kW, 10 kW, 15 kW 20 kW, 30 kW, 35 kW, 40 kW, 45 kW, 50 kW, 55 kW, 60 kW, 70 kW, 80 kW 90 kW, 95 kW or 100 kW or greater capacity generator or any capacity in between the stated numbers. The selection of the generator capacity also depends on the battery energy storage capacity and the duty cycle requirements as described before.

Figure 2:
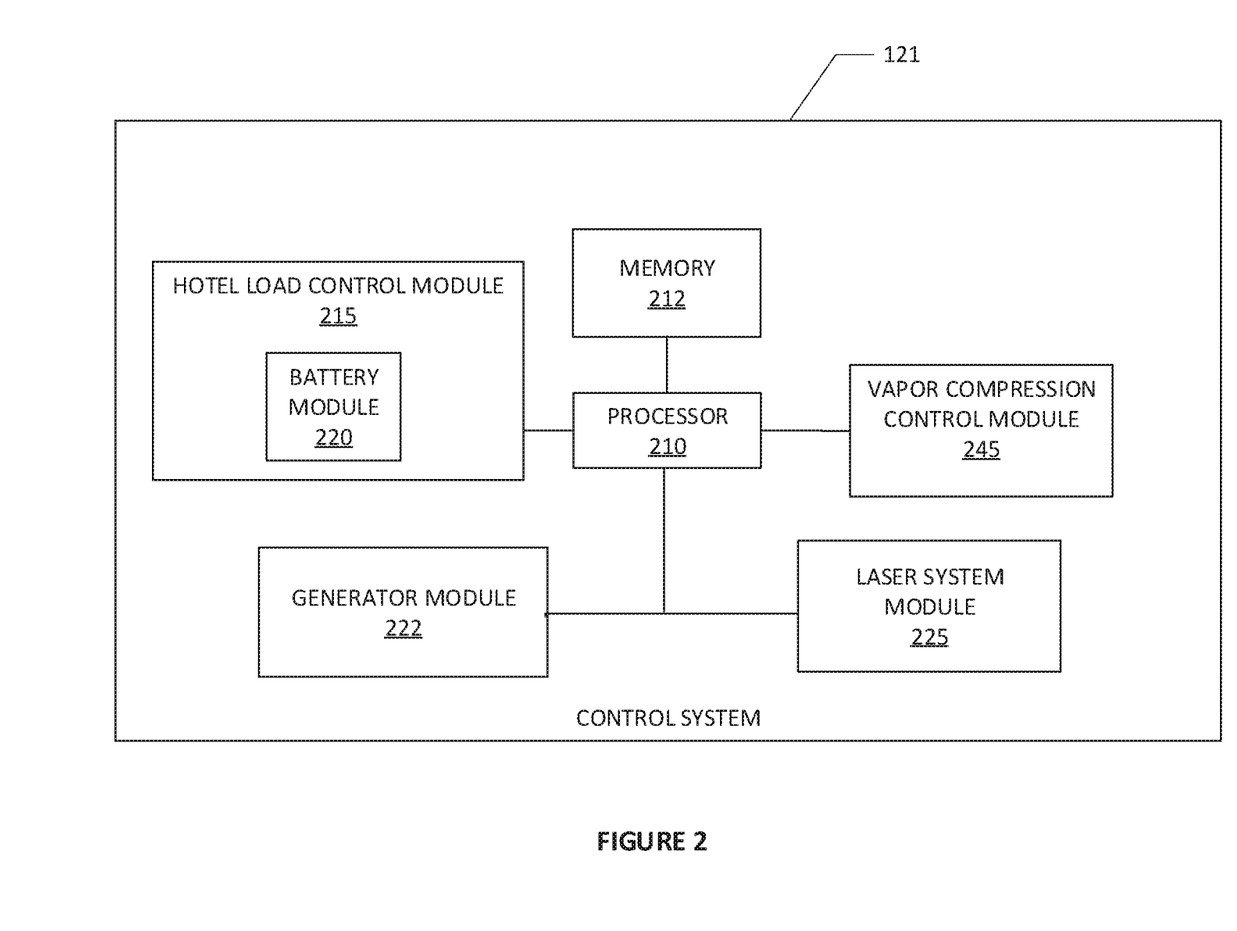
FIG. 2 is a block diagram of one embodiment of a control system for the DEW platform and vapor compression system.

FIG. 2 shows an illustration of the control system 121, which is programmed with instructions to control operations of components on the DEW platform 100. The control system 121 includes one or more processors 210 which may be any type of well-known microprocessor or microcontroller that is capable of managing the valves, fans and other components of the system 100. The processor 210 is connected to a memory 212 for storing programs and commands for operating the system. The processor also has inputs to receive external signals that trigger alert or readiness protocols based on the battlefield conditions, incoming threat alerts, etc. which in turn may initiate the thermal process to various precondition stages As shown, the control system 121 also includes a hotel load control module 215 for controlling cooling of the hotel loads within the DEW platform 100. The hotel load control module 215 may include instructions for reading data from temperature or other environmental sensors as well as combat related signals and determining the proper parameters for cooling or heating the hotel load or other components that are located on the DEW platform and adjacent the laser system. For example, if the hotel load control module 215 receives data from sensors showing that one or more hotel loads is above for example 40° C. it may activate or increase the cooling power of the vapor compression system, or reroute heat transfer fluid and thus cooling capacity through the controllable valves to reduce the temperature of the particular hotel load back down to a target temperature. Similarly, if the hotel load control module 215 determines that the temperature of a particular component of the hotel load is below, for example, 5° C. it may initiate a heating cycle wherein heat transfer fluid that is above 5° C. is routed to the hotel load to warm it back to target temperature. The heat transfer fluid may be warmed by pumping heat transfer fluid to be in thermal contact with the condenser of the vapor compression system to absorb heat from the condenser. Alternatively, the heat transfer fluid may be warmed by routing the heat transfer fluid to be in thermal contact with another operational component, such as the generator, or it may be warmed through an electric or other heating coil in some embodiments.

In one embodiment, the hotel load control module 215 maintains the temperature of the hotel load or ancillary equipment within the range of 25° C. to 50° C. In another embodiment, the hotel load control module 215 maintains the temperature of the hotel load or ancillary equipment within the range of 20° C. to 30° C. However, embodiments are not limited to only these temperature ranges. The hotel load control module 215 may be designed to maintain the temperature of the thermal load or ancillary equipment to be above its minimum equipment design operating temperature in cold climates for an efficient start-up. Similarly, the hotel load control module 215 may be designed to cool the hotel load or ancillary equipment to be below the equipment's maximum design operating temperature at any ambient temperature if the equipment generates heat. This allows the equipment to be placed in relatively hot ambient environments, such as the desert, where the ambient conditions alone may require cooling of the equipment to be within the range of, for example, 5° C. to 40° C.

The hotel load control module may compare the measured temperature to a table of temperatures and operating conditions to determine if the current temperature of a component is within the operational parameters for that particular hotel load. If the temperature is within its operational parameters, then the control system may not take any action to further cool the component. In one example if a radar system is approaching an upper threshold of its operational temperature, then the control system may alter the controllable valves within the DEW platform to move an additional volume flow of heat transfer fluid to a heat exchanger in thermal contact with the radar system. If the vapor compression system does not have additional capacity to cool the radar system, the control system may increase the speed of one or more of the variable speed compressors, or start an additional compressor within the vapor compression system to add additional cooling capacity, along with increasing the flow rate of heat transfer fluid to the radar system to provide it with the necessary cooling capacity.

Within the hotel load control module is a battery submodule 220. The battery submodule 220 is configured for managing the temperature of the battery bank within the system. The battery submodule 220 may monitor temperature and other parameters, of the battery bank, including and charge state, charge and/or discharge rate, ambient temperature, and fan speed of any external fans providing cooling to the battery bank. The battery submodule 220 may include a table of the operational temperature parameters for the battery bank and be responsive to maintaining the battery bank within its operating parameters. The control system 121 may use a combination of fan speed and heat transfer fluid flow to manage the temperature of the battery within its operational temperatures. The control system may also monitor the power demands being placed on the battery as a leading indicator of the temperature as increased power demands are likely to lead to increased temperature of the battery over time. The control system may also monitor the active status of the laser system. If the laser system becomes active, or is about to begin a firing cycle, the control system may increase the fan speed and flow of heat transfer fluid to the battery in anticipation that a firing event is about to occur which will lead to a rapid increase in the battery temperature as the laser system draws high amounts of current from the battery.

A generator module 222 within the control system 121 is configured to manage the operations of the electrical generator on the DEW platform. The generator module 222 may monitor the temperature of the generator, its current operating output compared to its maximum output, and the flow of heat transfer fluid to a heat exchanger in thermal communication with the generator, provided the conditions are such that the normal radiator cooling of the generator is not sufficient to support operations. Because the generator and the battery bank together provide the electrical needs to the DEW platform, the control system may be configured to provide the most efficient delivery of electricity to the various components on the DEW platform depending on the current operating status of the components. For example, if the DEW platform is in a standby position and not operational, it may only need a small amount of power to keep the required components in a standby mode. These energy requirements may be met by the battery providing the low amount of power, with the generator only becoming active once the battery bank has drained its power by a predetermined amount. In contrast, the system may also determine that in its current configuration, the battery must remain fully charged in case an urgent firing need arises, and the generator may be instructed to run at a low capacity to replenish the battery charge while the battery manages the electrical needs of the necessary components so the battery bank maintains a full charge.

Of course, the control system is not limited to only managing thermal loads at these temperature parameters. The hotel load control module 215 may detect when temperatures of a thermal load is above 15° C., 20° C., 25° C., 30° C., 35° C., 40° C. or more before activating the vapor compression system. In some embodiments the hotel load control module 215 is also configured to maintain the operating temperature of equipment that is part of a subsystem of a particular hotel load. For example, the equipment needing to be cooled may be adjacent to, or electronically linked with main hotel loads such as optics, electronic warfare equipment, radar, electronic or power inverters, batteries, cabin/enclosures and warfighter cooling systems. The hotel load control module 215 may be designed to sense the temperature of, and maintain the operating temperatures of, each of these hotel load subsystems in addition to maintaining the operating temperature of the main hotel loads on the DEW platform.

The hotel load control module 215 may also gather data from other sources, such as through a network connection to determine the predicted environmental temperature for the day. For example, the hotel load control module 215 may receive the predicted daytime high temperature from a weather service across a network and use that data to ensure that the thermal load or other ancillary components of the target system remain cool to a predetermined target temperature. More importantly, the control module 215 may receive signals of an impending threat or other battlefield conditions and use that data to ensure all components are thermally conditioned or prepped for the possible events.

The processor 210 also communicates with a laser system module 225 which includes instructions for activating a cooling cycle in response to the directed energy weapon system being activated to begin firing or in response to external signals of impending threat or battlefield conditions. In one embodiment, the laser system module 225 is programmed to activate a cooling cycle from the vapor compression system and begin to rapidly cool the thermal load when a predetermined signal is received by the control system 121. The signal may be an activation signal from a firing system connected to the laser system or an external signal as mentioned above. With each firing event the laser system may interface with the vapor compression system to trigger the cooling mode of the vapor compression system 115 in order to reduce the temperature of the laser system, and more particularly the laser diodes and diode amplifiers as well as other components, such as the beam control, optical bench and beam director within the laser and optics system that require cooling as part of the laser system.

In one embodiment, the laser system module 225 communicates with a temperature sensor which monitors the temperature of the laser weapon system. In one embodiment, the laser system module 225 activates a cooling cycle by interfacing with a vapor compression control module 245 when the temperature of the laser system reaches a predetermined temperature. For example, when the temperature of the laser system is above 30° C. then the laser system module 225 instructs the vapor compression control module 245 to activate a second compressor within the vapor compression system to provide additional cooling capacity to the cooling loop. In other embodiments, in addition to increasing compressor speed and/or activating a second, third or fourth compressor, the laser system module 225 may instruct the vapor compression control module 245 to change the position of one or more configurable valves or change the pulse frequency on one or more a solenoid valves within the system to adjust the heat transfer fluid flow if the temperature of the laser system is above 35° C. or above 30° C. or above 35° C. Of course, during activation, the speed of the compressors, and positions of the configurable valves may be altered to maintain the temperature of the thermal load of the laser system below a certain target temperature.

It should be realized that aspects of the control system may manage the variable speed operation of various pumps and fans within the system based on the temperature of the thermal load. For example, as the temperature of the thermal load, or surrounding environment, increases the speed of pumps and fans within the system may also increase. Similarly, as the temperature of the thermal load, or surrounding environment decreases, the control system may slow the speed of the pumps and/or fans.

B. Operation

In operation, a cycle may be activated when a laser weapon system is first activated to be put into use. While the below operation is described for circulating heat transfer fluid to hotel loads, it should be realized that the system is not limited to using traditional liquid heat transfer fluids, and refrigerant undergoing phase change may also work similarly within the system.

As can be realized, the DEW platform may include ancillary equipment that needs to be cooled before the system becomes fully operational. For example, the ancillary equipment may be powered on in advance of the laser system being ready to activate. The control system may therefore activate the controllable valves such that the heat transfer fluid is pumped to the vapor compression system to be cooled, and then routed to the various components of the hotel load heat exchangers. The valves may be set to recirculate the heat transfer fluid from the hotel load heat exchangers back to the evaporator heat exchanger in the vapor compression system to release the heat that was gathered by all the equipment on the DEW platform.

Once the system is ready to fire, the vapor compression system may be put into a firing mode where it starts to activate one or more additional compressors, increase speed, to add cooling capacity to the vapor compression system so the cooling loop can manage the cooling requirements of the laser weapon system as soon as a firing event is detected or a control signal indicates immediate firing is about to be initiated. Once a firing event is signaled or detected the vapor compression system will enter a rapid cooling cycle where the fluid pump for the heat transfer fluid may increase in speed and the controllable valves may be set to maximize the amount of heat transfer fluid passing through the laser system heat exchanger. In one embodiment the system may also include a thermal energy storage system that is configured to provide additional cooling power. One example of such a thermal energy storage system may be found in U.S. patent application Ser. No. 16/864,771 filed on May 1, 2020, which is hereby incorporated by reference in its entirety.

As the control system continues to detect firing events and transfers heat from the laser system heat exchanger to the heat transfer fluid in the cooling loop, the control system may monitor each component on the DEW platform to ensure that the vapor compression system is operating efficiently. For example, in one embodiment the heated heat transfer fluid from the directed energy system heat exchanger may not be routed directly back to the vapor compression system, but instead may be routed to the other hotel load components of the DEW platform.

Figure 3:
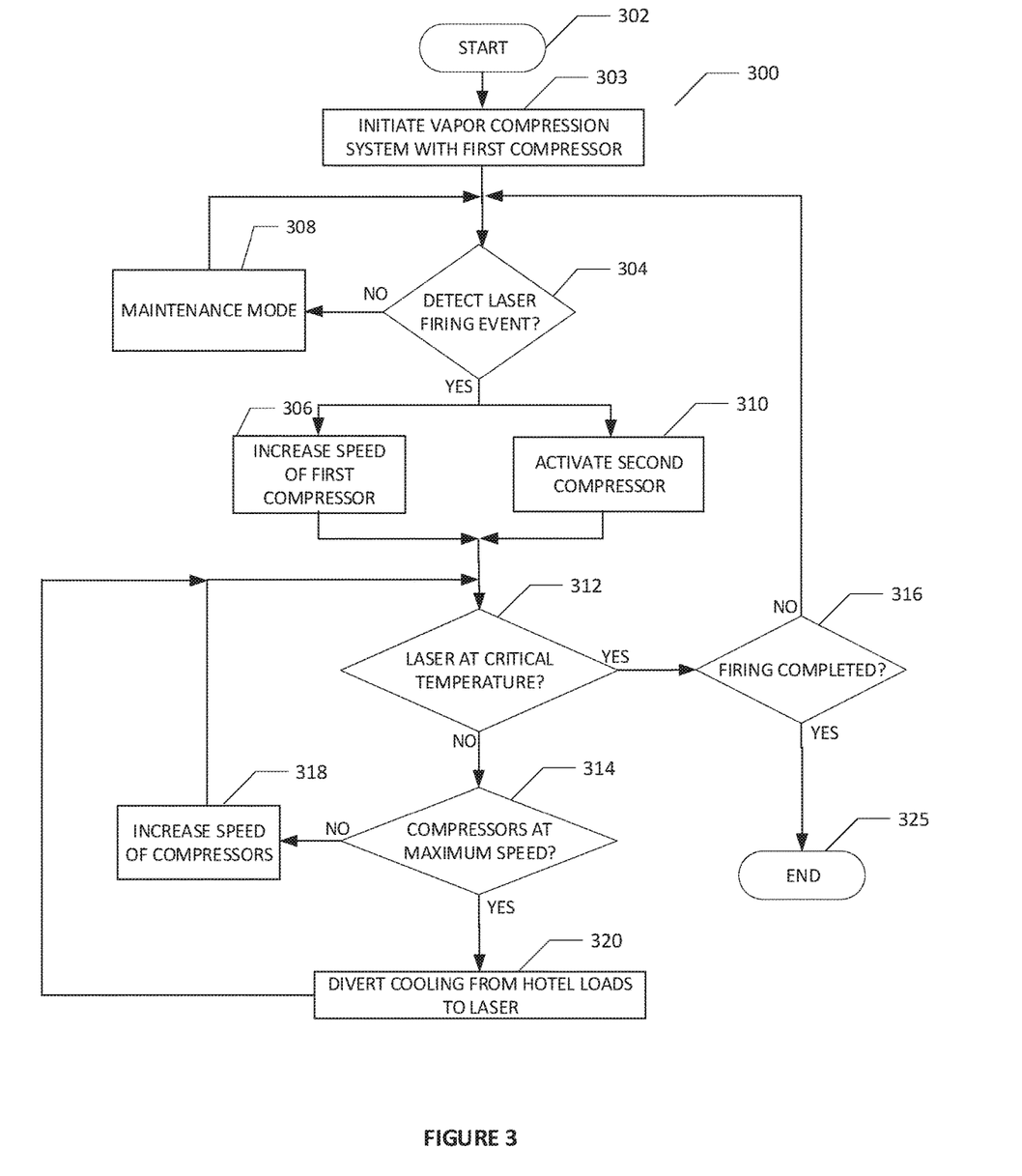
FIG. 3 is a flow diagram of one embodiment of operating a flexible vapor compression system and the DEW platform.

FIG. 3 describes one process 300 for cooling a laser weapon system. The process 300 begins at a start state 302 and then moves to a state 303 wherein a first compressor operation is initiated within the vapor compression system. This first compressor would typically be used to provide enough cooling to the heat transfer fluid circulating in the cooling loop to maintain the temperature of the hotel loads as well as the laser, during times when there is no firing, within their operating parameters. Of course, the speed of the first compressor may vary depending on the ambient temperature and other load factors of the equipment as well as environmental factors such as insolation, wind, etc. affecting the temperature of each component on the DEW platform.

Once the first compressor is initiated, the process 300 moves to a decision state 304 wherein a determination is made whether a laser firing event is expected or has been detected by the control system. If a laser firing event is not anticipated or detected the process 300 moves to state 308 and enters a maintenance mode. In the maintenance mode the vapor compression system continues to maintain all loads at a target operational temperature so that the system is ready to operate once a firing event has been signaled to be expected or detected. During the maintenance mode the vapor compression system may provide enough cooling power to cool selected components of the DEW platform. In addition, fans and blowers may also be used to maintain certain hotel load components at their target temperatures, while trying to minimize the amount of energy used.

If a determination made at the decision state 304 that a laser firing event has been detected, then the process 300 moves to a state 306 wherein the speed of the first compressor is increased to immediately add more cooling capacity to the cooling loop on the DEW platform. As the speed of the first compressor (or compressors) are being increased by a predetermined amount, the process 300 also moves to a state 310 wherein one or more additional compressors, or multiple additional compressors, are activated to also increase the cooling capacity of the vapor compression system. The increase of speed of the first one or more compressors and the activation of additional one or more compressors most often occur in parallel, although they may also occur serially. This may allow the vapor compression system to quickly absorb the bursts of heat coming from the laser weapon system. The laser weapon system may output, for example 20, 25, 50, or 75 kilowatts of heat energy during each firing event that needs to be absorbed by the heat transfer fluid circulating in the cooling loop, and then transferred to the evaporator in the vapor compression system.

The process 300 then moves to a determination state 312 wherein a decision is made whether the laser system has reached a critical temperature. The critical temperature may be that temperature where the laser can still function effectively to continue firing, and not be overheated. Typically, this critical temperature may be between 15° C. and 35° C. and for some systems between 20° C. and 30° C. If a determination is made at the decision state 312 that the laser system is at a critical temperature and within its operational parameters, the process 300 moves to a decision state 316 to determine whether the firing process has completed or been halted. If the firing process has not been halted completed, then the process returns to decision state 304 to wait for additional firing events to occur. If a determination is made that the firing has been halted or completed at the decision state 316, then the process 300 terminates at the end state 325.

If a determination is made at the decision state 312 that the laser weapon system is above the target temperature for safe operation then the process 300 moves to a decision state 314 to determine if the vapor compression system compressors are all operational and all at their maximum speed. As discussed above, the vapor compression system may have 2, 3, 4, or more compressors configured to provide flexible cooling to the DEW platform components. If the control system needs to add additional cooling power, then it can activate any compressor that is not operational yet, if any, and increase the speed of each compressor if they are variable speed compressors to increase the amount of cooling within the vapor compression system.

If a determination is made at the decision state 314 that the compressors are not at their maximum speed, then the process 300 moves to a state 318 where the speed of one or more or all of the compressors is increased to provide additional cooling power to the laser system. If a determination is made at the decision state 314 that the compressors are all at their maximum rated speed, then the process 300 moves to a state 320 wherein the control system analyzes the temperatures of the hotel loads within the DEW platform to determine if any cooling power may be shifted away from particular components in order to allow more cooling power to be used on the laser system. For example, if the compressors are already running at maximum speed, and the laser system is starting to become too hot to allow additional firing episodes, the control system may input the temperatures of the other hotel loads, and reduce cooling to the least critical hotel load. If the battery bank is still below its maximum operating temperature and can operate with ambient air fan cooling without damaging the cells, the control system may close the valves from the cooling loop to the battery bank and operate the fan to use air ambient air cooling only to keep the battery bank below its maximum allowable temperature. This would reduce the temperature of the heat transfer fluid returning to the vapor compression system (since it will now bypass the battery bank) and allow the vapor compression system to provide more cooling capacity to the laser system.

Of course, it should be realized that the hotel loads also have maximum operating temperatures above which they cannot safely function. Thus, if the temperature of the laser it too high and additional cooling power is needed, but the temperature of the hotel loads are already near their maximum values and no hotel function can be compromised, the system may need to be operated with a different firing pattern with more pauses in between the laser bursts. For example, if the typical burst were 6 seconds with 6 seconds in between bursts, the in between time may need to be extended to 8 or 9 seconds. The control system is programmed to balance the amount of cooling necessary to allow the laser to continue firing with the measured temperature of each component of the hotel loads so that none of the components are allowed to become hotter than their maximum rated operational temperature.

Figure 4:
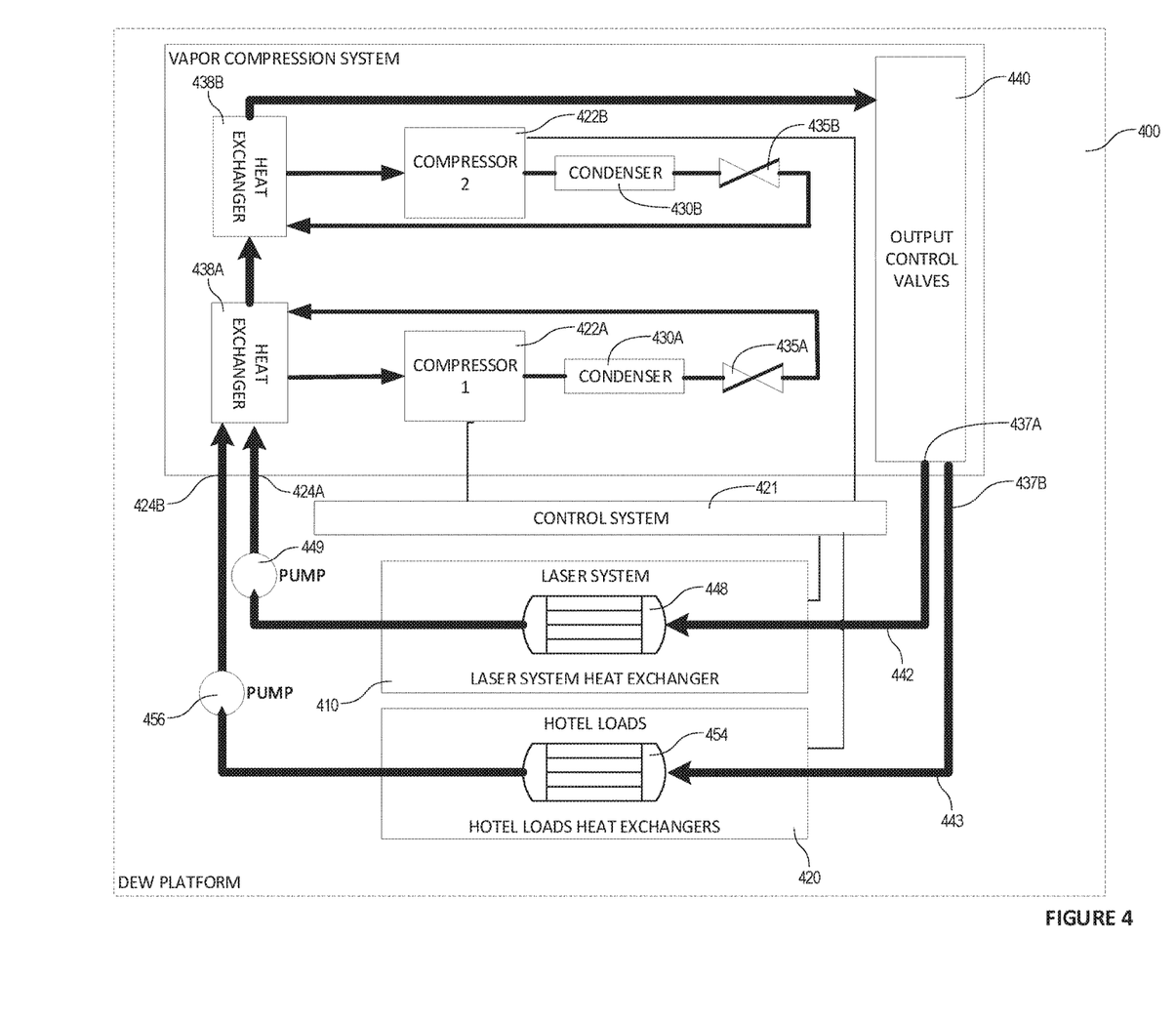
FIG. 4 is a schematic illustration of an alternative embodiment of a Directed Energy Weapon platform having a laser system, vapor compression system, generator, battery bank and ancillary equipment according to an alternate embodiment.

Referring now to FIG. 4, an alternate embodiment of a DEW platform 400 having a vapor compression system with parallel cooling loops. As shown the DEW platform 400 includes a laser system 410, vapor compression system 415 and hotel loads 420. A control system 421 electronically communicates with the laser system 410, vapor compression system 415 and hotel loads 420 to control the operations of these components of the platform 400.

The vapor compression system 415 includes a first vapor compression loop which includes a compressor 422A connected to a condenser 430A, expansion valve 435A and evaporator heat exchanger 438A. The vapor compression system 415 also includes a second vapor compression loop running in parallel to the first vapor compression loop. The second vapor compression loop includes a second compressor 422B, second condenser 430B, second expansion valve 435B and second evaporator heat exchanger 438B.

Heat transfer fluid comes into the vapor compression system 415 at a first input 424A and a second input 424B. The heat transfer fluid runs from the inlets 424A,B to the first evaporator heat exchanger 438A. The heat transfer fluid then runs from the first evaporator heat exchanger 438A to a second evaporator heat exchanger 438B. From the second evaporator heat exchanger 438B, the heat transfer fluid connects to a set of output control valves 440 which control how the cooled heat transfer fluid is routed through the DEW platform 400.

As shown, the output control valves 440 communicate with two outlets, a first outlet 437A and a second outlet 437B. The first outlet 437A connects the outlet control valves 440 to a laser system coolant loop 442 that runs through a heat exchanger 448 within the laser system 410, to a first pump 449 and back through the inlet 424A to the vapor compression system 415. The second outlet 437B connects the outlet control valves 440 to a hotel loads coolant loop 443 that runs through one or more heat exchangers 454 within the hotel loads 420, to a second pump 456 and then back through the inlet 424B into the vapor compression system 415.

During operation, the control system 421 monitors sensors communicating with the laser system 410 and the hotel loads 420 in order to adjust the speed and activity of the compressors within the vapor compression system 415 and the pumps 449 and 456. During normal standby activities a single compressor may be operating and providing cooling or heating to the hotel loads through the coolant loop 443. The output control valves may control the flow of heat transfer fluid from the vapor compression system 415 to one or both of the outlet 437A or 437B to control which of the parallel coolant loops 442 and 443 receives heat transfer fluid or how the fluid flow is distributed between the loads on both coolant loops based on which loop needs cooling.

Once the system goes into an active mode, the pumps 449, 456 and additional one or more compressors 422B may be activated and/or first one or more compressors are increased in speed to add additional cooling power to the vapor compression system. The output control valves may be switched or modulated to provide a predetermined flow of heat transfer fluid to each of the coolant loops in order to cool the laser as its firing and also maintain the temperature of the hotel loads below a certain threshold.

The compressors 422A and 422B may be the same size compressor or may be different sized compressors. It should also be understood that first compressor may includes one or more compressors and the second compressor may also include one or more compressors. In one embodiment, the compressors are variable speed compressors. In addition, although the vapor compression system 415 is shown with one condenser for each one or more compressor, it should be realized that the one or more compressors may be connected to a single larger condenser that can handle the output of all compressors operating at their maximum capacity. Moreover, although the vapor compression system 415 is shown with two compressors, it should be realized that the system may have 3, 4, 5, or more compressors. In addition, the vapor compression system 415 may have a single evaporator connecting to both of the vapor compression loops and compressors shown in FIG. 4.

Although not shown in FIG. 4, the system may include a series of controllable valves within the system that are controlled by the control system 421 to manage the flow of heat transfer fluid or refrigerant through the various coolant loops as shown in FIG. 1. Similarly, the hotel loads of FIG. 4 may include a generator and battery bank, similar to that of FIG. 1.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. A directed energy weapon platform, comprising:
    a laser system including one or more components configured to generate heat during a firing event of the laser system;
    one or more hotel loads;
    a cooling loop configured to provide cooling to the one or more components and the one or more hotel loads;
    a vapor compression system comprising at least a first compressor and a second compressor configured to compress a refrigerant to cool the cooling loop as the cooling loop provides cooling to at least one of the one or more components or the one or more hotel loads; and
    a control system configured to:
        cause operation of the first compressor to cause the cooling loop to provide cooling to at least the one or more hotel loads,
        detect a signal indicative of the firing event of the laser system or an expected firing event of the laser system, and
        in response to detecting the signal, at least one of increase a speed of the first compressor or start the second compressor to increase the cooling provided by the cooling loop to at least the one or more components.

2. The system of claim 1, wherein the cooling loop is configured to circulate the refrigerant to provide cooling to the laser system and the hotel loads.

3. The system of claim 1,
    wherein the cooling loop is configured to circulate a heat transfer fluid to provide cooling to the laser system and the hotel loads, and
    wherein the first compressor and the second compressor are configured to compress the refrigerant to cool the heat transfer fluid using one or more evaporators of the vapor compression system.

4. The directed energy weapon platform of claim 3, wherein the heat transfer fluid is a glycol water mixture.

5. The directed energy weapon platform of claim 1, wherein the one or more hotel loads comprise a radar system.

6. The directed energy weapon platform of claim 1, wherein the one or more hotel loads comprise electronics configured to support the laser system.

7. The directed energy weapon platform of claim 1, wherein the hotel loads comprise a generator configured to provide electrical power to the laser system.

8. The directed energy weapon platform of claim 1, wherein the hotel loads comprise a battery bank configured to provide power to the laser system.

9. The directed energy weapon platform of claim 8, wherein the control system is configured to control battery bank output voltage control, battery bank charge and discharge, and a temperature of a heat transfer fluid within the cooling loop.

10. The directed energy weapon platform of claim 1, wherein at least one of the first compressor or the second compressor is a variable speed compressor.

11. The directed energy weapon platform of claim 1,
    wherein the laser system is configured to provide a laser output power during the firing event,
    wherein the vapor compression system is configured to provide a cooling capacity to cool the cooling loop, and wherein the vapor compression system is configured to increase the cooling capacity by 2.5 times to 4 times of the laser output power when the control system at least one of increases the speed of the first compressor or starts the second compressor.

12. The directed energy weapon platform of claim 1, wherein the laser system comprises a laser configured to output 50 kW or less of heat energy during the firing event.

13. The directed energy weapon platform of claim 1, wherein the laser is configured to output 20 kW or less of heat energy during the firing event.

14. The directed energy weapon platform of claim 1, wherein the temperature of the heat transfer fluid sent to the laser system is controlled to be below 30° C.

15. The directed energy weapon platform of claim 1, wherein the temperature of the heat transfer fluid sent to the laser system is controlled to be below 25° C.

16. The directed energy weapon platform of claim 1, wherein the laser system is configured to activate and fire the laser during a laser firing period of 180 seconds or less.

17. The directed energy weapon platform of claim 1, wherein the laser system is configured to activate and fire the laser during a laser firing period of 120 seconds or less.

18. The directed energy weapon platform of claim 1, wherein the laser system is configured to activate and fire the laser during a laser firing period of 60 seconds or less.

19. The directed energy weapon platform of claim 1, further comprising a heating system configured to generate electric resistance heat or heat from combustion of a fuel.

20. The directed energy weapon platform of claim 1, wherein the directed energy weapon platform includes a plurality of compressors, wherein the plurality of compressors includes the first compressor, the second compressor, and one or more additional compressors configured to compress the refrigerant.

21. The directed energy weapon platform of claim 20, wherein the plurality of compressors includes four compressors.

22. The directed energy weapon platform of claim 1, wherein the control system is configured to to maintain a temperature of the heat transfer fluid within a predetermined temperature range.

23. The directed energy weapon platform of claim 1, wherein the vapor compression system, laser system and hotel loads are in fluid communication through controllable valves configured to communicate with the control system.

24. The directed energy weapon platform of claim 1, wherein the first compressor comprises a compressor bank of at least two compressors.

25. The directed energy weapon platform of claim 1, wherein the second compressor comprises a compressor bank of at least two compressors.

26. The directed energy weapon platform of claim 1, wherein the firing event includes one or more laser bursts of the laser system with non-firing periods in between the one or more laser bursts.

27. The directed energy weapon platform of claim 26, wherein a laser burst of the one or more laser bursts is more than 1 second and less than 20 seconds in duration.

28. The directed energy weapon platform of claim 26, wherein a non-firing period of the non-firing periods is longer than 3 seconds.

29. The directed energy weapon platform of claim 1, further comprising a thermal energy storage system.

30. A method of operating a laser weapon system, comprising:
    operating, by a control system, a first compressor of a vapor compression system to compress a refrigerant to cool a cooling loop providing cooling to at least one or more hotel loads of a laser system, wherein the laser system includes one or more components configured to generate heat during a firing event of the laser system, and wherein the cooling loop is configured to provide cooling to the one or more components;
    detecting, using the control system, a signal indicative of a firing event of the laser system or an expected firing event of the laser system; and
    increasing, in response to detecting the signal, and using the control system, cooling provided to the one or more components by at least one of:
        increasing a speed of the first compressor compressing the refrigerant, or
        starting a second compressor of the vapor compression system, wherein the second compressor is configured to compress the refrigerant.

31. The method of claim 30, wherein the first compressor and the second compressor are variable speed compressors.

32. The method of claim 30, further comprising powering, using a battery bank, the laser weapon system during the firing event.

* * * * *